Dec. 14, 1948.  V. ALVEAR  2,456,477
ELECTRIC BATTERY IMPROVEMENT
Filed Feb. 12, 1948

INVENTOR.
Victor Alvear
BY
ATTORNEY

Patented Dec. 14, 1948

2,456,477

UNITED STATES PATENT OFFICE 2,456,477

ELECTRIC BATTERY IMPROVEMENT

Victor Alvear, Clifton, N. J.

Application February 12, 1948, Serial No. 7,785

3 Claims. (Cl. 136—133)

My invention relates to what are termed "dry cells."

The main object is to provide a cell which is rugged and durable and that can be made at low cost.

A special object is to provide a cell which is leak-proof.

Another object is to protect the cell from being short circuited, dirty or corroded before it is put into use.

The invention contemplates a cell of the usual form having a casing which constitutes the outer electrode and has a suitable circuit terminal and an inner electrode with its circuit terminal. The top of the casing is closed by an annular member secured to the outer casing and to the inner electrode. This top member is formed of a laminated sheet of metal, paper and insulating film and the inner electrode has a metallic terminal cap. Between this cap and the top is interposed an insulating shield which normally also covers the cap but which is ruptured or cut away to expose the terminal cap when the cell is to be used.

Figure 1:
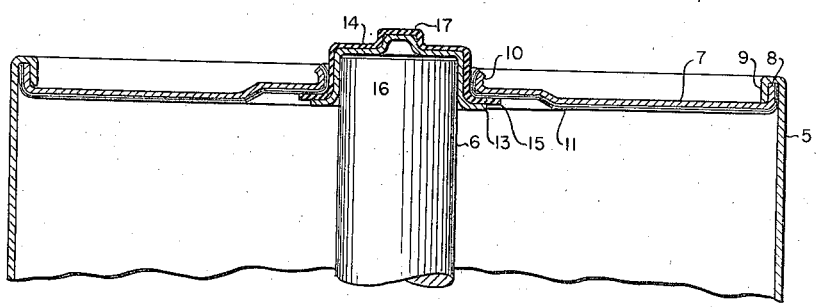
Fig. 1 is a longitudinal sectional view of the upper end of a cell embodying my invention.
Figure 2:
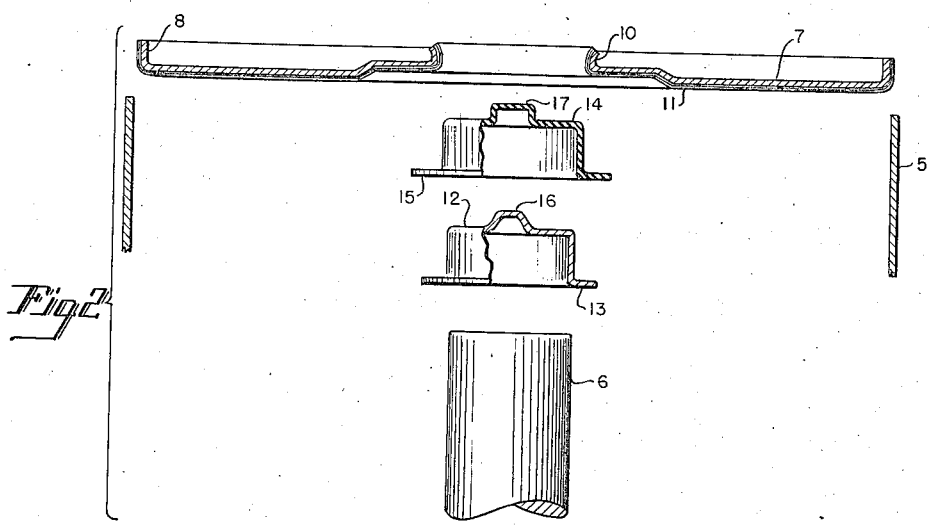
Fig. 2 is an exploded, partially in section, view showing the respective parts of the cell.

The casing 5 may be of any suitable metal such as zinc and provided with a suitable terminal (not shown). Usually such a casing is of cylindrical form and outwardly protected.

The inner electrode 6 is usually cylindrical and may be of suitable substance such as carbon. The annular top 7 has an outer flange 8 to which the rim of the casing is crimped as at 9. The inner edge 10 of the top is preferably flared or curled outwardly to form a neck. This top is formed of a sheet of metal which is laminated with a thin layer 11 of paper and a resinous substance such as Pliofilm so as to thoroughly insulate and protect the top.

The central terminal is formed by a cap 12 fitted tightly to the electrode 6 and preferably provided with an outwardly flaring flange 13.

The insulating shield 14 is interposed between the cap and the top and encloses the cap and has an outwardly flaring flange 15 which underlies the inner edge of the top so as to completely insulate the top from the terminal cap.

The outer end of the cap is preferably provided with a boss 16 which serves as the circuit terminal when the top 17 of the shield is sheared off. With this shield in place and unruptured, it will be seen that the terminal cap is completely guarded or protected against contact, dirt or corrosion.

It is understood that the specific construction or composition of the electrodes and the electrolyte is immaterial to this invention.

I claim:

1. In a dry cell, an outer electrode serving as a container and an inner electrode, a metallic cap secured to said inner electrode, an annular top crimped around its rim to said outer electrode and provided with a layer of insulating material on its inner face and an insulating shield covering said cap and interposed between said cap and said top.

2. A dry cell comprising an outer electrode wall, a central electrode, an annular top mechanically connecting said electrodes and provided with an inner insulating layer, a metallic cap embracing the end of the central electrode and having a peripheral flange, an insulating shield enclosing said metallic cap and interposed between said metallic cap and said top and adapted to be ruptured to expose the metallic cap.

3. A dry cell comprising a tubular outer electrode, a cylindrical inner electrode, a top secured to the outer electrode and coated with insulating material on its inner face, a terminal cap on the inner electrode, an insulating shield interposed between said cap and said top, said top having an outwardly flaring neck embracing said shield.

VICTOR ALVEAR.

No references cited.